United States Patent [19]

Hall

[11] 4,336,919
[45] Jun. 29, 1982

[54] BALL VALVE

[75] Inventor: Alan D. Hall, Brighouse, England

[73] Assignee: Lake & Elliot Incorporated, Wilmington, Del.

[21] Appl. No.: 111,162

[22] Filed: Jan. 10, 1980

[30] Foreign Application Priority Data

Sep. 26, 1979 [GB] United Kingdom ............... 7933390

[51] Int. Cl.³ ............................................. F16K 5/06
[52] U.S. Cl. ..................................... 251/214; 251/315
[58] Field of Search ................................. 251/214, 315

[56] References Cited

U.S. PATENT DOCUMENTS

| | | | |
|---|---|---|---|
| 3,216,697 | 11/1965 | Holmberg | 251/214 |
| 3,841,601 | 10/1974 | Grove et al. | 251/315 |
| 3,940,107 | 2/1976 | Allenbaugh, Jr. | 251/315 |
| 4,103,867 | 8/1978 | Orr | 251/315 |
| 4,150,811 | 4/1979 | Condit | 251/315 |
| 4,175,580 | 11/1979 | Kalbfleisch | 251/315 |
| 4,184,507 | 1/1980 | Richards | 251/315 |

Primary Examiner—H. Jay Spiegel
Attorney, Agent, or Firm—Berman, Aisenberg & Platt

[57] ABSTRACT

A ball valve is disclosed comprising a single piece body with a ball-shaped, two-part valve member therein operable by a rotatable stem formed separately from the valve member, this stem being so formed that it cannot be blown out from the valve by internal pressure in the valve during servicing.

The stem extends from the interior to the exterior of the valve through a stem passage providing, adjacent the chamber which houses the valve member, a first plain bearing supporting a portion of the stem for rotation about the stem axis. The stem has an enlarged portion within the valve chamber which is too large to pass the first plain bearing, the enlarged portion having a shoulder adapted for sealing engagement with a seat formed within the valve body around the stem passage. A detachable bridge forms a bearing element which provides a second plain bearing for a reduced diameter portion of the stem of the valve member and also forms with, a thrust washer and a further shoulder provided by the stem, a thrust bearing which normally holds the stem in a position in which the first-mentioned shoulder is spaced from said seat formed within the valve body. A packing chamber filled with packing compressed axially by a gland is provided between the first and second bearings.

Thus the detachable bridge can be removed from the valve body and the valve stem for servicing of the gland and packing without danger of blow-out of the stem or leakage past the seal formed, after removal of the detachable bridge and outward displacement of the valve stem to bring the first-mentioned shoulder into sealing engagement with said seat formed within the valve body. In assembly of the valve, the stem is inserted from the interior of the ball chamber.

3 Claims, 2 Drawing Figures

BALL VALVE

FIELD OF THE INVENTION

This invention relates to ball valves, i.e. valves of the kind comprising a body having an inlet and an outlet opening aligned along a first axis and communicating with a chamber, disposed between said openings, in which is mounted a ball-shaped valve member having a passage extending therethrough, the valve member being mounted for rotation, in the body, about a second axis transverse to the first axis between a position in which the passage through the valve member is in alingment with said inlet and outlet openings, thus connecting the inlet and outlet openings, and a position in which the passage through the valve member extends transversely to said first axis and said valve member cuts off said inlet opening from said outlet opening, the valve member being rotatable between these positions, about said second axis, by means of a stem connected with said valve member and extending from the valve body.

BACKGROUND OF THE INVENTION

While valves of this kind to which the invention relates are commonly constructed with a body which is in a plurality of parts and which can be assembled about a corresponding valve member formed as a single integer, this construction presents various difficulties in manufacture and in operation, particularly with regard to obtaining proper alignment between and sealing between the parts of the body to secure satisfactory operation.

To avoid these difficulties it is known, for example from British patent specification No. 991,111, to construct the body in a single piece and to make the ball-shaped valve member in two discrete parts, which, in assembly of the valve, are passed separately through the inlet or outlet openings into the central chamber and are fitted together therein, after which the operating stem, formed separately from the valve member parts, is introduced, along said second axis, through a stem passage extending along said second axis and providing a bearing for the stem, sealing means being provided in said stem passage around the stem to prevent leakage from the valve along the stem passage.

With this arrangement, as the construction is such as to allow the stem to be introduced, during assembly, through the stem passage from the outside of the valve body, it is necessary to provide means for preventing ejection, or blow out, of the stem under pressure within the valve, and to design such means to be detachable for servicing of the valve for example for servicing the sealing means provided between the valve stem and the valve. Unfortunately, there is a danger, with such a design that if due care is not taken during servicing to ensure that the valve is turned off and isolated from fluid under pressure, removal, during servicing, of the means for preventing blow-out of the stem will result in the stem being ejected from the valve body by the fluid pressure within the valve, which is inconvenient and may even, depending on the conditions, be particularly dangerous.

SUMMARY OF THE INVENTION

It is an object of the present invention to provide a ball valve, having a one-piece body and a valve member of composite construction, which is free from the above noted disadvantage and in which the stem sealing means can readily be serviced without disconnecting the valve from the installation in which it is fitted and whilst the valve is under internal fluid pressure.

According to the invention there is provided a ball valve comprising a single-piece body having a first axis and a second axis transverse to said first axis, the body having an inlet and an outlet opening aligned along said first axis of said body, a chamber defined within said body intermediate said inlet and outlet openings and communicating therewith, a ball-shaped valve member disposed in said chamber and having a passage extending therethrough, means supporting said valve member for rotation in said chamber, about said second axis of said body, between a position in which said passage extends in alignment with said inlet and outlet openings along said first axis and a position in which said passage extends transversely to said first axis and said valve member cuts off said inlet opening from said outlet opening, the valve further including an operating stem for said valve member, a stem passage being formed through said body along said second axis, an operating stem for said valve member, means mounting said stem for rotation in said body about said second axis, interengaging coupling means on said stem and said valve member entraining said valve member for rotation with said stem, abutment means on said stem for preventing, by engagement with abutment means on said body, removal of said stem from said body by movement of the stem axially from the body along said second axis, said stem, from said abutment means thereon to the end of the stem outside the body part, being of a size to pass along the stem passage past said abutment means on said body, whereby in assembly of the valve said stem can be fitted into said stem passage by passing the stem through one of said openings into said chamber and extending the stem through said stem passage from the interior of said chamber, the valve further including sealing means for sealing said valve stem with respect to the body, said sealing means being disposed on the side of said abutment means further from said chamber and being accessible from the exterior of said body whereby, in use, said sealing means can be replaced without disconnecting the valve body from any associated pipe fittings while the stem is prevented from blowing out of the valve body by said abutment means on the stem and body.

DESCRIPTION OF THE PREFERRED EMBODIMENT

Figure 1:
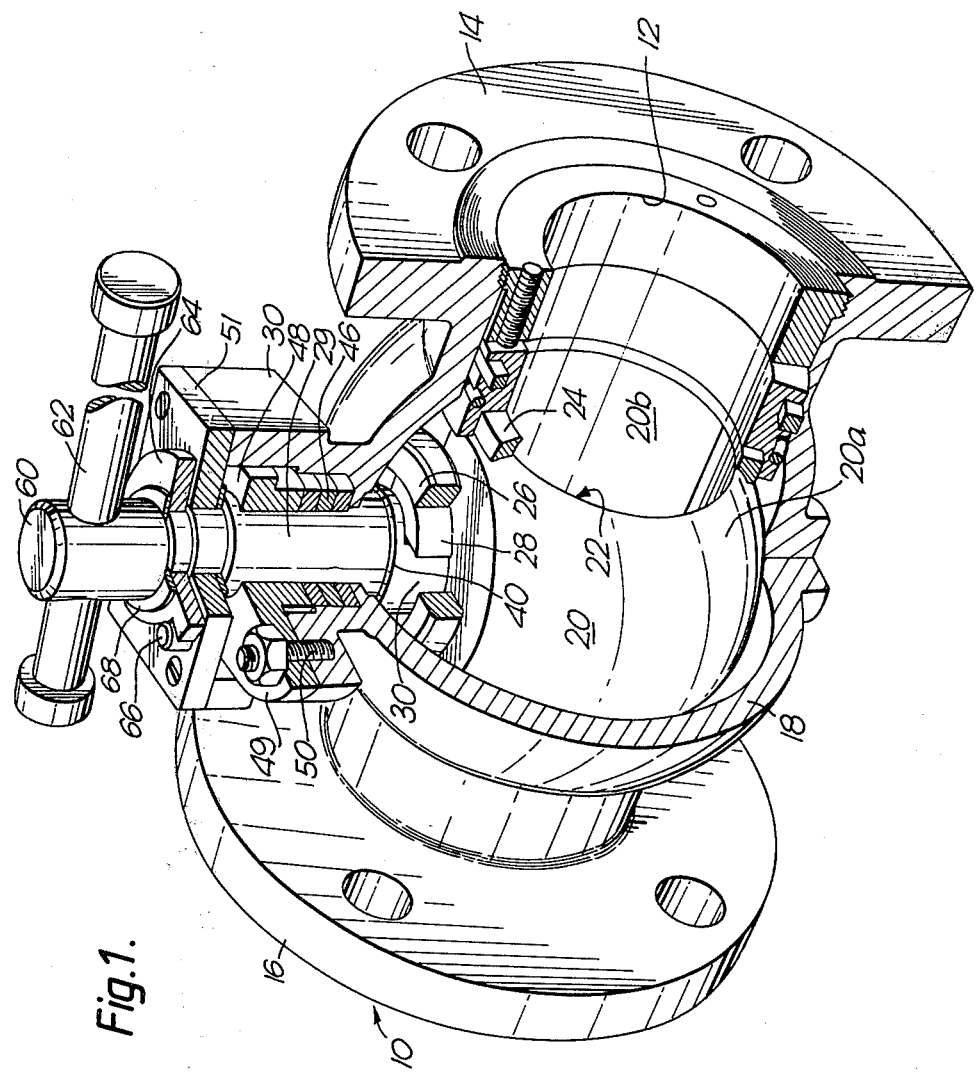
FIG. 1 is a cut-away, perspective view of a valve embodying the invention.

As shown in FIG. 1, a ball valve comprises a one-piece body 10 affording an inlet opening 12 surrounded by a fixing flange 14, and outlet opening (not shown), surrounded by a fixing flange 16, the inlet and outlet openings being aligned with one another along a common first axis and being connected with a central chamber 18, for a valve member, by respective passages extending along said first axis.

The valve member 20 is ball-shaped and has a cylindrical passage 22 therethrough which, in a fully open position of the valve, is coaxial with the inlet and outlet openings along said first axis. The ball 20 comprises two halves 20a and 20b which engage one another along respective planar mating faces lying in a plane which contains the axis of the bore 22. The last mentioned plane also contains a second axis about which the ball 20 is rotatable in the valve body between said fully open position and a closed position in which the respective passage leading to each inlet or outlet opening is blocked by an imperforate portion of the periphery of the valve member 20 afforded by one or other of the halves 20a, 20b, and in which a sealing ring 24 disposed at the inner end of each said passage leading from an inlet or outlet opening is sealingly engaged with the surface of the respective half of the valve member 20.

The two halves 20a, 20b, of the valve member 20 are held together and located in the desired relationship with respect to one another by means of a keeper ring 26 engaging around collar portions 28 of the valve member halves and by an interengaging key arrangement, not shown, disposed in the part of the valve member which is diametrally opposite the collar formations 28. The collar formations 28 and the keeper ring 16 are coaxial about said second axis.

The valve member 20 is movable between its open and closed positions from the outside of the valve via a valve operating stem 29 of overall cylindrical form having its axis coincident with said second axis and received in a coaxial stem passage extending from the chamber 18 in a spigot 30 of the valve body.

At its end which extends within the valve chamber 18 the stem 29 is formed with diametrally opposite parallel flats defining at this end of the stem 29 a driving key 30 which fits snugly in a corresponding key way provided by a rectangular section slot 32 extending diametrally across the collar formation 28.

The key 30 is formed in an end portion, of enlarged diameter of the stem 29 which adjoins a portion 34, of somewhat reduced diameter, extending over the major part of the axial length of the stem 29 and being of constant external diameter throughout. The portion 34 forms a journal which is rotatably received in a bearing 36 formed by a bore, along said second axis, in the body part 10, which bore 36, at its end nearest the said first axis opens in a flat annular coaxial shoulder 38 which faces into and defines part of the wall of the interior of the chamber 18. A slight frusto-conical countersink coaxial with the bore 36 is formed at the transition between the bore 36 and the annular face 38 and the enlarged end portion of the stem 29 is connected with the portion 34 via a correspondingly frusto-conical shoulder 42 which, when the valve is partially dismantled for servicing as explained in detail below, can make sealing engagement with the countersink 40 to limit movement of the stem 29 along said second axis out of the valve body.

The part of the stem passage which adjoins the bore 36 at the end of the latter furthest from the chamber 18 is of substantially greater internal diameter than the stem 29 and defines, with the stem 29, an annular packing chamber 44 filled by a suitable packing, preferably fire-safe packing, to provide a seal between the stem 29 and spigot 30. The packing 46 is maintained under axial compression by a gland 48 which, as shown in FIG. 1, has two lugs 49 extending therefrom in diametrally opposite directions, each said lug 49 having a bore therethrough through which freely extends a respective screw threaded bolt 50 fixed in a flange provided by the spigot 30, each said bolt 50 extending parallel with said second axis and carrying, on the side of the respective lug 49 furthest from said axis a respective clamping nut by means of which the gland 48 can be urged, along said second axis, towards said first axis, to compress the packing 46.

Figure 2:
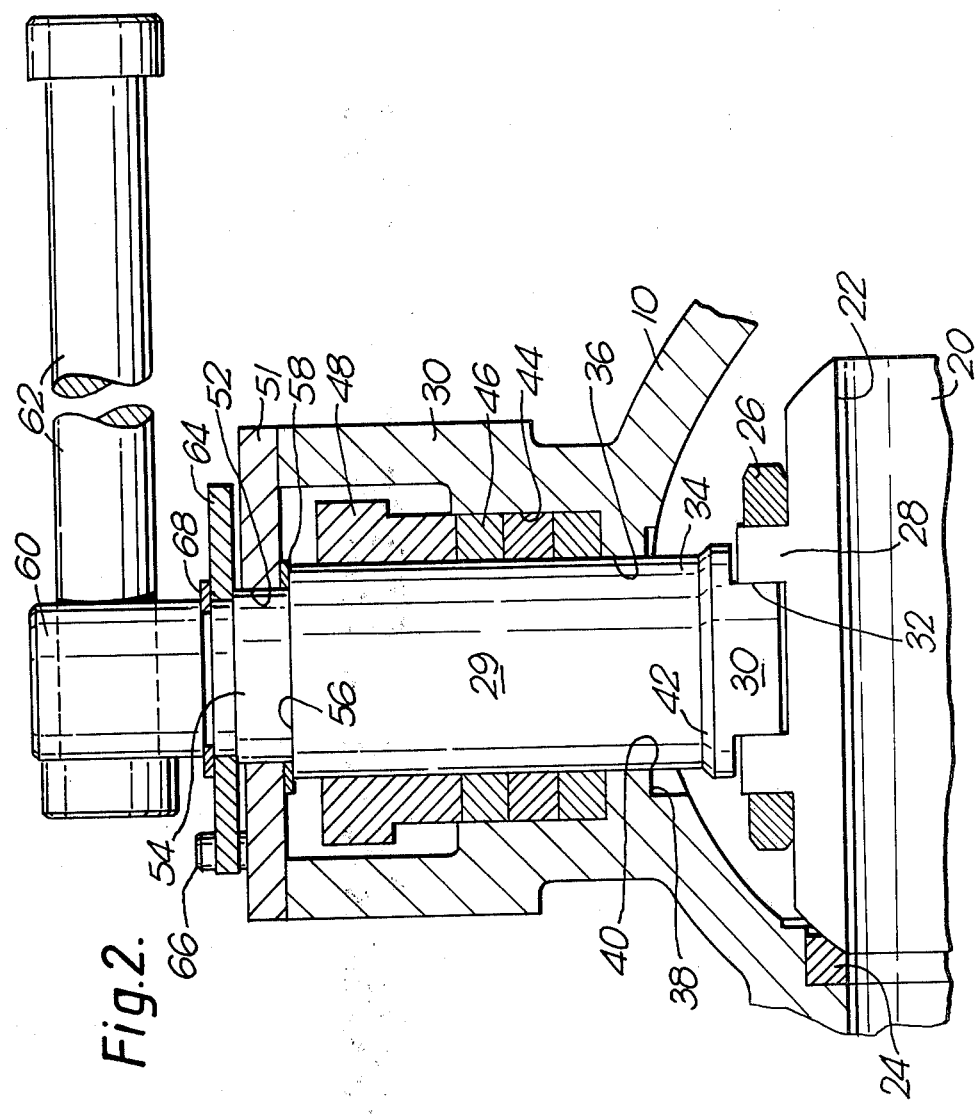
FIG. 2 is a fragmentary view, in axial section and to a larger scale, showing part of the valve of FIG. 1.

Bolted to the end of the spigot 30 which is furthest from the valve member is a bearing element in the form of a bridge 51 which has a bore 52 therethrough coaxial with the bore 36 and affording a second bearing, of reduced diameter with respect to the bearing 36 and which receives a cylindrical journal formed by a reduced diameter portion 54 of the stem 29. An annular shoulder 56, facing away from the valve member 20, is formed on the stem 29 between the portion 34 and a portion 54 and forms, in conjunction with a shoulder provided by the side of the bridge 51 which faces towards the valve member and a thrust washer 58 disposed between the last mentioned two shoulders, a thrust bearing which limits axial movement of stem 29 out of the valve body to a position in which, as shown in FIG. 2, a substantial axial clearance exists between the frusto-conical shoulder 42 and the countersink 40. Thus, in normal use of the valve, the shoulder 42 is out of engagement with the countersink 40.

A portion 60 of the stem 29 of reduced diameter with respect to portion 54 projects from the bridge 51 and has a transverse bore receiving an operating bar 62. The portion 60 also carries a travel stop 64, serving, in conjunction with a stop peg 66 carried by the bridge 51, to limit angular movement of the stem 29 about said second axis to 90 degrees between said open and said closed positions of the valve. The travel stop 54 is in the form of a plate held in position on the portion 60 by a circlip 68 engaged in a corresponding annular groove in the portion 60.

As will be noted from FIG. 1, since the nuts on the bolts 50 are accessible with the bridge 51 in place, it is unnecessary to disturb the bridge 51 merely to adjust the compression to which the packing 46 is subjected. However, should it be necessary, for example, to renew the packing 46, the bridge 51 may be unbolted from the spigot 30 and, after removal of the bar 62, circlip 68 and travel stop plate 64 may be removed from the stem 29 along said second axis (i.e. upwardly in FIG. 2) after which the thrust washer 58 may be slipped off and the gland 48 removed to allow removal of the packing 46.

It will be noted that even should the interior of the chamber 18, in the region outside the valve member 20, be filled with fluid under pressure, the stem 29 will not be blown out of the valve body but will move outwardly only so far as is necessary to allow the shoulder 42 to engage the countersink 40 and that under this condition leakage from the chamber 18 through the stem passage will be substantially prevented, even when the packing 46 has been removed, by the sealing engagement between the shoulder 42 and the countersink 40. Fresh packing can then be inserted and the valve re-assembled by a reversal of the procedure noted.

In initial assembly of the valve, the stem 29 is, of course, inserted through the stem passage in spigot 30 from the interior of the chamber 18, after having been introduced therein via the inlet or the outlet opening, before introduction of the two halves of the valve member 20.

The valve described with reference to the drawings, besides enjoying the advantages of known valves of the general type to which it belongs has the additional advantage of incorporating an operating stem which cannot be accidentally blown out from the valve body by internal pressure. Furthermore, the thrust washer 58, being disposed externally of the valve chamber, is not exposed to the fluid within the valve, as is the case in certain known valves incorporating a thrust washer for the valve operating stem internally of the valve, and replacement of the washer 58, if necessary, can easily be carried out without removing the valve from the installation in which it is fitted or disturbing the gland 48.

Furthermore, since the valve stem 29 is rotatably supported in two bearings spaced relatively widely apart along the axis of stem 29, angular movement of the stem 29 about axes perpendicular to its longitudinal axis is prevented, thus avoiding damage to the gland 48.

I claim:

1. A ball valve comprising a single-piece body having a first axis and a second axis transverse to said first axis, the body having an inlet and an outlet opening aligned along said first axis of said body, a chamber defined within said body intermediate said inlet and outlet openings and communicating therewith, a ball-shaped valve member disposed in said chamber and having a passage extending therethrough, means supporting said valve member for rotation in said chamber, about said second axis of said body, between a position in which said passage extends in alignment with said inlet and outlet openings along said first axis and a position in which said passage extends transversely to said first axis and said valve member cuts off said inlet opening from said outlet opening, the valve further including an operating stem for said valve member, a stem passage being formed through said body along said second axis, means mounting said stem for rotation in said body about said second axis, interengaging coupling means on said stem and said valve member entraining said valve member for rotation with said stem, abutment means on said stem for preventing, by engagement with abutment means on said body, removal of said stem from said body by movement of the stem axially from the body along said second axis, said stem, from said abutment means thereon to the end of the stem outside the body, being of a size to pass along the stem passage past said abutment means on said body, whereby in assembly of the valve said stem can be fitted into said stem passage by passing the stem through one of said openings into said chamber and extending the stem through said stem passage from the interior of said chamber, the valve further including sealing means for sealing said valve stem with respect to the body, said sealing means being disposed on the side of said abutment further from said chamber and being accessible from the exterior of said body whereby, in use, said sealing means can be replaced without disconnecting the valve body from any associated pipe fittings while the stem is prevented from blowing out of the valve body by said abutment means on the stem and body, said body having a bore therein defining part of said stem passage, the ball valve further comprising a bearing element having a bore therethrough aligned with said bore in said body, and means securing said bearing element detachably to said body, and wherein said means mounting said stem for rotation in said body about said second axis includes a first bearing formed by said bore in said body, and a second bearing formed by said bore in said bearing element, and wherein said body has a surface onto which said bore in said body opens and which surface faces towards said valve member, said abutment means on said body being afforded by said surface having a bore therethrough affording a first bearing, said stem having first and second journals respectively received in said first and second bearings respectively, said second bearing being disposed further from said chamber and from said abutment means on said stem than said first bearing, said stem on the side of said first journal remote from said abutment means having a size to pass through said second bearing whereby after detachment of said bearing element from said body the bearing element can be withdrawn from the stem over the end of the latter remote from said chamber and said valve member, said sealing means being disposed between said bearing element and said bearing formed in said body, wherein said bearing element includes a shoulder facing along said second axis towards said chamber, and said stem includes a shoulder facing away from said chamber along said second axis, and the ball valve further comprising thrust bearing means serving to limit movement of said stem along said second axis away from said chamber to a position in which a separation is maintained between said abutment means on the stem and said body, said thrust bearing means including said shoulders, wherein said detachable bearing element comprises a central portion affording said second bearing and respective end portions extending in opposite radial directions away from said central portion, and wherein said body has two pillar members extending on opppsite lateral sides of said stem in substantially the same direction as that in which said stem extends, means mounting a respective said end portion of said bearing element on a respective said pillar, and wherein said sealing means includes a packing chamber surrounding said stem and forming part of said stem passage, packing disposed in said packing chamber, a gland around said stem defining an end of the packing chamber further from said valve member than the other end of the packing chamber, said gland including a central portion having an aperture through which said stem extends, and further including two arms extending in opposite radial directions from said central portion, each said arm extending through a respective one of the two openings defined on either side of the spindle between the two pillars, the valve body and the bearing element, and screw-down means connecting each said arm at its end projecting beyond the pillars and the bearing element, with the valve body, whereby said screw-down means is accessible from the exterior of the valve while said detachable bearing element is still secured to said body, so that the said screw-down means can be operated, without disturbing the detachable bearing element, to draw said gland towards said valve member along said second axis to compress said packing.

2. The ball valve of claim 1 wherein said abutment means on said stem and said body part are interengageable sealingly to prevent leakage from the valve along said valve body when said sealing means is removed for replacement.

3. The ball valve of claim 1 wherein said thrust bearing means includes a thrust washer disposed around said stem between said shoulders.

* * * * *